United States Patent [19]

Gilbert

[11] Patent Number: 4,799,810
[45] Date of Patent: Jan. 24, 1989

[54] VERY HIGH SPEED MARGINALLY LUBRICATED BALL THRUST BEARING

[75] Inventor: Robert B. Gilbert, Phoenix, Ariz.

[73] Assignee: Allied-Signal Inc., Morris Township, Morris County, N.J.

[21] Appl. No.: 89,703

[22] Filed: Aug. 26, 1987

Related U.S. Application Data

[62] Division of Ser. No. 936,853, Dec. 2, 1986, Pat. No. 4,729,154.

[51] Int. Cl.[4] ............................................. F16C 33/44
[52] U.S. Cl. .................................... 384/606; 384/492; 384/609; 384/614; 384/907.1; 384/909; 384/913
[58] Field of Search ............... 384/609, 614, 492, 606, 384/907.1, 913, 909

[56] References Cited

U.S. PATENT DOCUMENTS

| | | |
|---|---|---|
| 1,332,176 | 2/1920 | Heindlhofer . |
| 2,158,156 | 5/1939 | Schroder . |
| 3,027,626 | 4/1962 | Murphy . |
| 3,097,897 | 7/1963 | Taylor . |
| 3,212,834 | 10/1965 | Mayer et al. . |
| 3,472,567 | 10/1969 | Johnson . |
| 3,567,504 | 3/1971 | Hopkins et al. . |
| 3,832,023 | 8/1974 | Fairbank . |
| 4,040,687 | 8/1977 | Rogers . |
| 4,397,507 | 8/1983 | Kraus et al. . |
| 4,511,193 | 4/1985 | Geczy ................................. 384/615 |
| 4,541,786 | 9/1985 | McLean . |
| 4,634,300 | 1/1987 | Takebayashi et al. ............. 384/548 |

Primary Examiner—Lenard A. Footland
Attorney, Agent, or Firm—Terry L. Miller; James W. McFarland

[57] ABSTRACT

A ball thrust antifriction bearing for operation at very high speed in the DN number range from $5 \times 10^5$ to $2 \times 10^6$ and higher while only marginally lubricated by a mist of liquid having comparatively poor lubricating qualities which is carried in a transporting air stream.

14 Claims, 1 Drawing Sheet

VERY HIGH SPEED MARGINALLY LUBRICATED BALL THRUST BEARING

This is a division of application Ser. No. 936,853, filed Dec. 2, 1986, now U.S. Pat. No. 4,729,154.

BACKGROUND OF THE INVENTION

The field of the present invention is antifriction bearings of the ball type having an annular inner and outer raceway containing the balls along with an annular separator member. More particularly, the invention relates to ball bearings for very high speed applications wherein only marginal, as opposed to flooded, lubricating and cooling fluid flow is provided to the bearing.

Ball bearings having steel races and steel balls and being capable of sustaining both radial and axial (thrust) loads under conditions of high speed operation are known. These bearings must be provided with adequate flow of lubricating and cooling liquid. This lubricating flow is provided by flooding the bearing with oil, or by providing a marginally lubricating oil mist carried in an air stream.

Also known are ball bearings for use at indeterminate speeds having steel inner and outer races and nonmetallic balls. These bearings may employ ball elements of gem stone or mineral. Such a teaching is set forth in U.S. Pat. No. 1,332,176, issued Feb. 24, 1920 to K. Heindlhofer. Alternatively, these bearings may employ ball elements of ceramic or glass material. A ball bearing teaching the use of ceramic ball elements for decidedly low speed operation is set forth in U.S. Pat. No. 2,158,156, issued May 16, 1939 to H. Schroder. Bearings having steel races and steel or ceramic ball elements have been employed for moderately high speed operation with oil flood or marginal oil mist lubrication in an air flow.

However, in selected aerospace turbine engine applications it is desirable to employ the jet fuel of the engine as lubricant and coolant in the engine bearings. Unfortunately, when compared with oil, jet fuel is not a good lubricant. Ball bearings of known construction have been employed with steel balls flooded or marginally lubricated by JP-4 jet fuel with moderate success up to a DN number of about $5 \times 10^5$. Those skilled in the bearing art will recognize the DN number as being the product of bearing inner race bore diameter in millimeters and rotational speed during use in rotations per minute (RPM). However, when operated with other fuels, such as JP-5, these same bearings have failed under the same operating conditions. JP-4 fuel is recognized as containing trace elements such as sulphur and nitrogen compounds which are not present to the same extent in JP-5 fuel, and which are thought to act as lubricants.

Accordingly, conventional thinking in the bearing art has held heretofore that a ball bearing having steel inner and outer races and steel or ceramic ball elements could not be operated at DN numbers above $5 \times 10^5$ when lubricated by jet fuel. The demands of advancing technology in the aerospace turbine engine field call for ball thrust bearings capable of operating at DN numbers above $5 \times 10^5$, and desirably for very high speed operation in the DN number range of $1 \times 10^6$ to $2 \times 10^6$, or higher. This operating speed range is, of course, well beyond the known operating limits for lubrication of a ball bearing with jet fuel.

SUMMARY OF THE INVENTION

In view of the above, it is a primary object for this invention to provide a ball thrust bearing capable of sustaining operation at high speed above a DN number of $5 \times 10^5$ while lubricated by jet fuel.

A further object of the invention is to provide such a bearing capable of sustained operation at very high speed in the DN number range from $1 \times 10^6$ to $2 \times 10^6$, or higher, while lubricated by jet fuel.

Additionally, an object of the invention is to provide such a bearing capable of operation up to a DN number of about $1.7 \times 10^6$ while marginally lubricated only by jet fuel mist in an air stream.

Still further, an object is to provide a bearing capable of operation at a DN of $1.7 \times 10^6$ while marginally lubricated by any jet fuel chosen from the group consisting of JP-4, JP-5, and JP-10.

Accordingly, the Applicant has happily discovered that a ball thrust bearing according to the invention having steel inner and outer races, with silicon nitride ceramic balls, and a Vespel polyimide SP-21 separator member will surprisingly operate completely successfully at a DN number of above $5 \times 10^5$ while only marginally lubricated with any one of the previously identified jet fuels. Vespel polyimide SP-21 is a product of E. I. DuPont de Nemours.

In the course of seeking a solution to the above-recited objects, the inventor tested known bearing constructions. All conventional bearings tested failed to meet the objectives of the present invention, which was expected in view of the state of the bearing art. For example, a ball thrust bearing having steel inner and outer races, with steel ball elements, and a silver plated steel separator failed after just a few seconds of operation at 37,000 RPM while marginally lubricated with a mist of JP-10 jet fuel in an air stream. This bearing had an inner diameter of 45 mm., so that the DN number was $1.67 \times 10^6$.

An unexpected result of the present invention has been completely successful operation by the Applicant of bearings according to the invention at a DN number of $1.67 \times 10^6$ while only marginally lubricated by JP-4, JP-5, or JP-10 liquid mist in an air stream. Still more surprisingly, bearings according to the invention have been operated while lubricated as described above from zero speed at $-65°$ F., with a rapid spin up to 37,000 RPM in as little as six seconds so that the bearing is subjected to full operating speed while very cold. Thereafter the bearing warms to operating temperature expected within a turbine engine and continues operation for a set time. Such use stimulates a high-altitude cold start of a turbine engine and is recognized as being very severe on the bearing because of the dimensional changes which occur while the bearing is increasing in temperature at high or very high operating speeds. The rapid spin up while at low temperature did not cause any internal damage to the bearings tested which might have shortened their service life.

These and other objects and advantages of my invention will appear from a reading of the following detailed description of a single preferred embodiment of the invention in conjunction with the drawing Figures.

Teachings of the bearing art which may be considered relevant to my invention are found in the following patents, two of which have previously been referred to herein:

| PATENT NUMBER | ISSUED | PATENTEE |
| --- | --- | --- |
| 1,332,176 | 2/24/20 | Heindlhofer |
| 2,158,156 | 5/16/39 | Schroder |
| 3,027,626 | 4/3/62 | Murphy |
| 3,097,897 | 7/16/63 | Taylor |
| 3,212,834 | 10/19/65 | Mayer et al |
| 3,472,567 | 10/14/69 | Johnson |
| 3,567,504 | 3/2/71 | Hopkins et al |
| 3,832,023 | 8/27/74 | Fairbank |
| 4,040,687 | 8/9/77 | Rogers |
| 4,397,507 | 8/9/83 | Kraus et al |
| 4,541,786 | 9/17/85 | McLean |

DETAILED DESCRIPTION OF THE PREFERRED EMBODIMENT OF THE INVENTION

Figure 1:
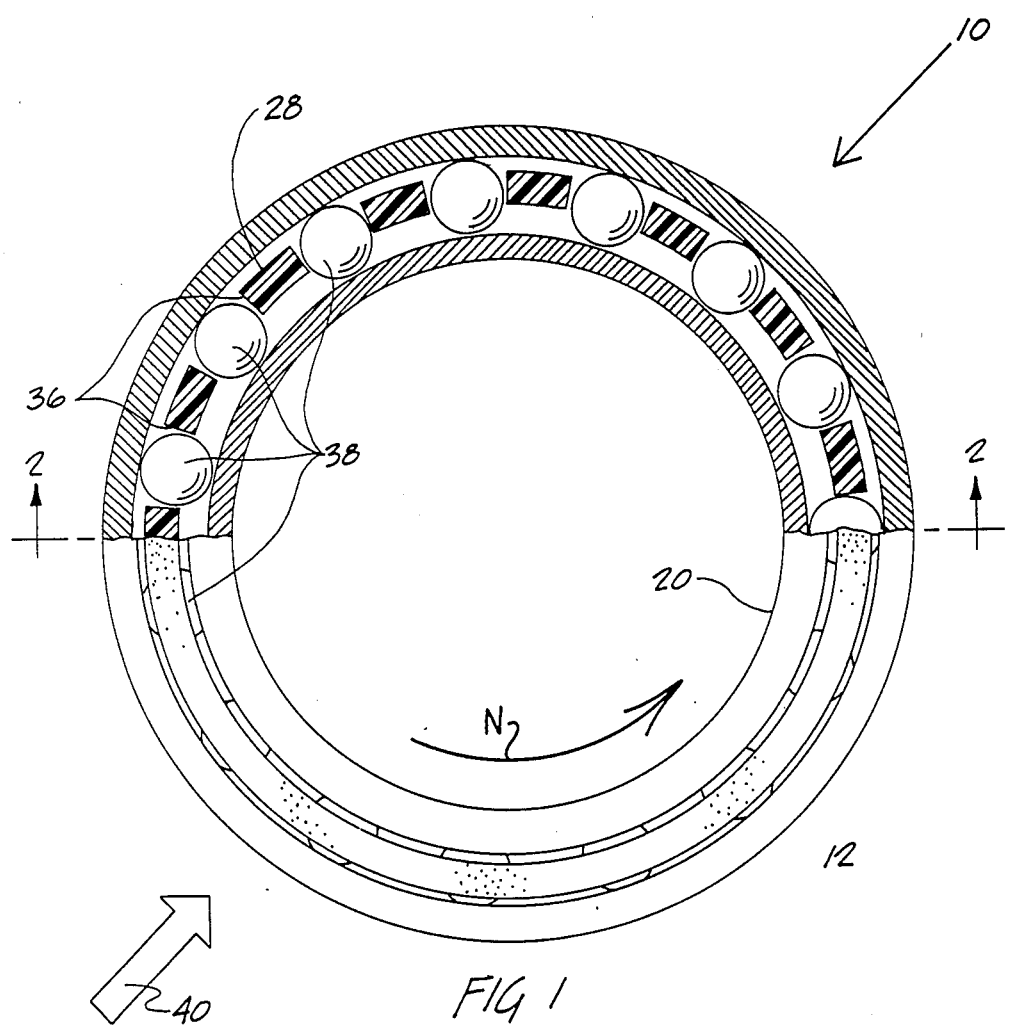
FIG. 1 is a side elevational view of a ball bearing embodying the invention, with parts broken away and partially in section to better illustrate the structure thereof.
Figure 2:
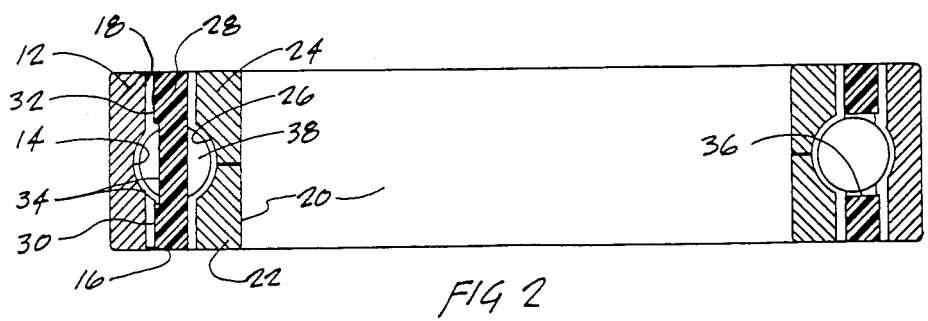
FIG. 2 depicts a cross-sectional view taken along line 2—2 of FIG. 1.

FIGS. 1 and 2 taken together depict a bearing 10 according to the present invention. Bearing 10 includes an outer annular race member 12 constructed of conventional bearing quality steel alloy and having a radially inwardly disposed arcuate bearing race groove 14 disposed between axially spaced apart cylindrical surfaces 16,18. Within the outer race member 12 is disposed a two-piece, inner annular race member generally referenced with the numeral 20. The race member 20 is also constructed of bearing quality steel and includes two substantially mirror image sections 22,24 which cooperate to define a radially outwardly disposed bearing race groove 26 confronting groove 14.

Interposed between the inner race member 20 and outer race member 12 is a single-piece annular separator member 28. The separator member defines a pair of axially spaced apart radially outwardly disposed rubbing surfaces 30,32 which lie on opposite sides of a groove 34 thereon, and which confront surfaces 16,18 of outer race member 12. The separator member 28 also defines a plurality of circumferentially spaced apart ball-receiving cylindrical openings or bores 36 extending radially therethrough. The separator member 28 is made from DuPont Vespel SP-21 which is believed to be a polyimide polymer loaded homogeneously with about 20% carbon graphite solid lubricant. Consequently, it will be seen that the separator member 28 assists in lubrication of the bearing 10. Also, it must be noted that while the rubbing surfaces 30,32 of separator member 28 confront and may, due to gyration of separator member 28, actually contact the surfaces 16,18 of outer race member 12, these surfaces are desirably spaced apart to define a radial clearance therebetween.

Received in the openings 36 and grooves 14,34 of the bearing 10 is a plurality of ball rolling elements, each referenced with the numeral 38. The ball elements 38 make rolling contact with each of the inner race member 20 and outer race member 12 to allow low-friction relative rotation thereof (arrow N, viewing FIG. 1). Because the grooves 14 and 34 are both relatively deep in relation to the diameter of balls 38, the bearing 10 is able to sustain a considerable axial (thrust) load in addition to radial loads. Ball elements 38 are fabricated from solid silicon nitride ceramic. The ball elements 38 as well as surfaces of grooves 14 and 34 are ground to smooth surface finishes conventional in the bearing art.

During operation of the bearing 10 at DN of $5 \times 10^5$ or higher a lubricating and cooling mist of jet fuel is provided in a stream of air, depicted by arrow 40 viewing FIG. 1. The stream of air serves to transport the jet fuel mist and is not, the Applicant believes, essential to successful operation of bearing 10 at very high speeds. As has been mentioned, the jet fuel mist cannot be considered very effective lubricant. However, the jet fuel, by its heat of vaporization, is believed to cool the bearing 10 and prevent generation of excessively high temperature therein. The Applicant also believes the separator member 28 is very important to successful operation of the bearing 10 at very high speeds contemplated by the present invention. In other words, the Vespel SP-21 of which separator member 28 is made has been found to be very lubricious, or to possess a very low coefficient of friction, in combination both with the steel of inner and outer races 12,20, and the silicon nitride ball elements 38. Consequently, an overall low coefficient of friction is achieved among all of the component parts of bearing 10.

As mentioned hereinbefore, testing of bearings according to the present invention has verified the surprising and unexpected result of the presently disclosed combination of construction materials. Bearings according to the present invention have been operated at DN numbers well above $5 \times 10^5$, and as high as about $1.7 \times 10^6$ with only marginal jet fuel mist lubrication as described with completely satisfactory results. Further, any of the jet fuels JP-4, JP-5, or JP-10 may be used to lubricate the present inventive bearing. On the other hand, operation of the best conventional bearings at DN numbers of $1.7 \times 10^6$ and the same lubrication conditions results in utter failure of the bearings in very short time.

While my invention has been depicted and described herein by reference to a particularly preferred embodiment thereof, no limitation upon the invention is implied by such reference, and none is to be inferred. My invention is intended to be limited only by the scope and spirit of the appended claims which also provide additional definition of the invention. Several modifications to my invention may suggest themselves to those skilled in the bearing art, and are intended to fall within the scope of the appended claims. For example, the Applicant has disclosed the use of DuPont Vespel polyimide SP-21 as a material of construction for separator member 28. However, other materials having sufficient mechanical strength, compatibility with jet engine fuels, and lubricity may also suffice to circumferentially space apart the ball elements 38 while preserving an overall low coefficient of friction for the bearing 10.

Having described my invention with sufficient clarity to allow one skilled in the art to make, use, and practice the invention, I claim:

1. A very high speed ball thrust bearing, said bearing comprising:
    a radially inner ball race member, and a radially outer annular ball race member spaced radially outwardly of said inner ball race member, each said ball race member defining a respective annular ball race groove confronting the other ball race member, and each ball race member being fabricated of bearing quality steel;

means for operation in the range of DN numbers $5\times10^5$ and above, where D is the bore diameter of the bearing in millimeters and N is the design operating speed of the bearing in rotations per minute, while said bearing is only marginally lubricated in operation by liquid jet engine fuel, said means comprising a plurality of like ceramic ball members captively disposed in both said ball race grooves radially between and spacing apart said ball race members and in rolling contact with both to provide low friction relative rotation thereof;

said means further comprising an annular separator member interposing radially between said ball race members and defining a matching plurality of circumferentially spaced apart ball-receiving openings therethrough, each of said ball-receiving openings receiving a respective one of said plurality of ball members, said separator member comprising a selected weight percent greater than zero percent of solid lubricant therein.

2. The invention of claim 1 wherein each of said plurality of ceramic ball members is solid silicon nitride.

3. The invention of claim 1 wherein said solid lubricant is carbon graphite.

4. The invention of claim 1 wherein said radially inner ball race member comprises a mirror image pair of annular members which cooperate to define said respective ball race groove.

5. Ball bearing apparatus for very high speed operation comprising:

an annular radially inner ball race member of bearing quality steel and defining a radially outwardly disposed first ball race groove;

an annular radially outer ball race member of bearing quality steel and defining a radially inwardly disposed second ball race groove radially outwardly of and confronting in radially spaced relation said first ball race groove;

a plurality of ball members interposing radially between said inner and said outer ball race members, said ball members each being of solid ceramic material;

means for circumferentially spacing apart said plurality of ball elements and providing lubricity therewith and with said ball race members, said spacing means including an annular one-piece separator member of polymer material having solid lubricant therein and defining a matching plurality of radially extending openings therethrough, each one of said openings receiving a respective one of said ball elements;

means for providing additional lubrication and cooling to said ball bearing in operation, said lubrication and cooling means providing a mist of liquid jet engine fuel in a transport air stream directed upon said ball bearing; and means for operating said ball bearing at a DN number in the range from $5\times10^5$ to $1.7\times10^6$ or higher, where D is the inner diameter of said radially inner ball race member in millimeters, and N is the relative rotational speed between said ball race members in rotations per minute.

6. The invention of claim 5 wherein said ceramic material is silicon nitride.

7. The invention of claim 5 wherein said solid lubricant is carbon graphite.

8. The invention of claim 5 wherein said polymer material is a polyimide.

9. The invention of claim 5 wherein said separator is formed entirely of DuPont Vespel SP-21.

10. The invention of claim 5 wherein said separator member and said radially outer ball race member each define an axially spaced apart pair of engageable surfaces confronting in radially spaced relation the surfaces of the other, said confronting surfaces being relatively rotational and engageable with one another upon gyration of said separator member.

11. The invention of claim 5 wherein said liquid jet fuel is selected from the group including JP-4, JP-5, and JP-10.

12. A very high speed ball thrust bearing for operating in the range of DN numbers from $5\times10^5$ and above, where D is the bore diameter of the bearing in millimeters and N is the design operating speed of the bearing in rotations per minute, while said bearing is only marginally lubricated in operation by liquid jet engine fuel, said bearing comprising:

a radially inner annular ball race member, and a radially outer annular ball race member spaced radially outwardly of said inner ball race member, each said ball race member defining a respective annular ball race groove confronting the other ball race member, and each ball race member being fabricated of bearing quality steel;

a plurality of like ceramic ball members captively disposed on both said ball race grooves radially between and spacing apart said ball race members and in rolling contact with both to provide low-friction relative rotation thereof;

an annular separator member interposing radially between said ball race members and defining a matching plurality of circumferentially spaced apart ball-receiving openings therethrough, each of said ball-receiving openings receiving a respective one of said plurality of ball members, said separator member comprising a selected weight percent of solid lubricant therein, and wherein said separator member comprises polyimide polymer.

13. The invention of claim 12 wherein said separator member comprises Vespel SP-21.

14. A very high speed ball thrust bearing for operation in the range of DN numbers from $5\times10^5$ and above, where D is the bore diameter of the bearing in millimeters and N is the design operating speed of the bearing in rotations per minute, while said bearing is only marginally lubricated in operation by liquid jet engine fuel, said bearing comprising:

a radially inner annular ball race member, and a radially outer annular ball race member spaced radially outwardly of said inner ball race member, each said ball race member defining a respective annular ball race groove confronting the other ball race member, and each ball race member being fabricated of bearing quality steel;

a plurality of like ceramic ball members captively disposed in both said ball race grooves radially between and spacing apart said ball race members and in rolling contact with both to provide low-friction relative rotation thereof;

an annular separator member interposing radially between said ball race members and defining a matching plurality of circumferentially spaced apart ball-receiving openings therethrough, each of said ball-receiving openings receiving a respective one of said plurality of ball members, said separator member comprising a selected weight percent of solid lubricant therein; and wherein said radially outer ball race member defines a pair of radially inwardly disposed cylindrical surfaces which are axially spaced apart on opposite sides of said ball race groove therein, said separator member defining a similarly axially spaced apart radially extending pair of annular protrusions defining an annular groove therebetween, said pair of protrusions each defining a radially outwardly disposed surface confronting in radially spaced relation a respective one of said cylindrical surfaces, whereby said separator member is allowed sufficient gyrational freedom to contact said protrusion surfaces thereof with said cylindrical surfaces of said outer ball race member.

* * * * *